Patented Feb. 14, 1950

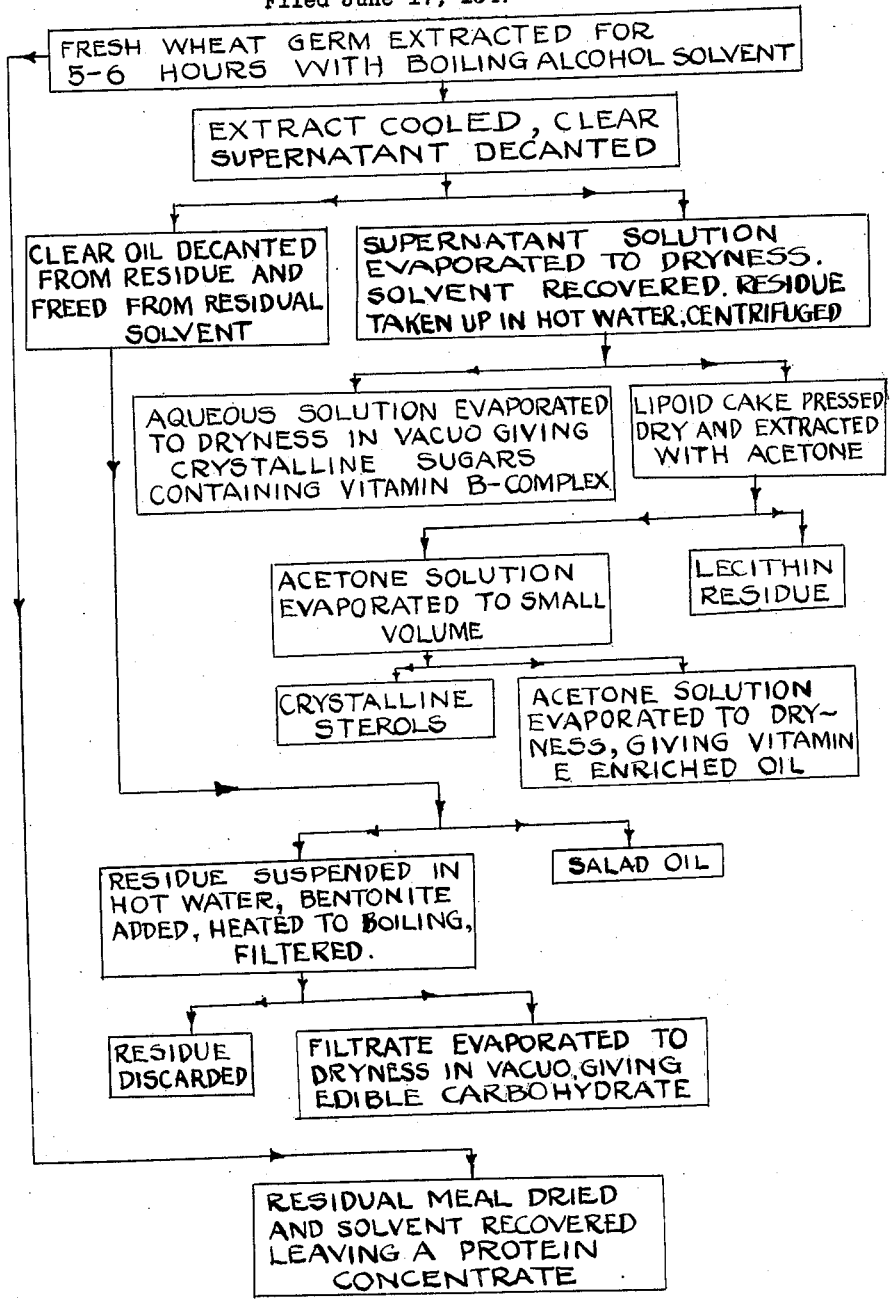

2,497,317

UNITED STATES PATENT OFFICE 2,497,317

PREPARING VITAMIN E ENRICHED OIL

William Douglas McFarlane, Ste.-Anne-de-Bellevue, Quebec, Canada, assignor to Victory Mills Limited, Toronto, Ontario, Canada, a corporation of Ontario Application June 17, 1947, Serial No. 755,146

2 Claims. (Cl. 167—81)

This invention relates to the recovery of wheat germ products by means of a boiling alcoholic solvent, preferably an acidulated alcoholic solvent, to produce, in particular vitamin E enriched oils and novel vitamin B enriched sugars.

Wheat germ is a relatively rich source of vitamin E, sterols and lecithin, products highly prized by the food and drug industries. Furthermore, wheat germ is a good source of vitamin B-complex, and of simple sugars, which I have learned to recover jointly, to yield two new products of nutritional importance, namely, vitamin B enriched crystalline sugars, and vitamin B enriched sugar syrups.

All previous processes for obtaining vitamin E enriched oil from wheat germ known to the inventor are lengthy, expensive, and involved. The oil is usually extracted from the wheat germ with an organic solvent such as hexane or ethylene dichloride, and the solvent must then be completely removed, a step which is achieved only with great difficulty. A fractionation of the oil must then be carried out by processes which are tedious, time-consuming and expensive.

It is the object of the present invention to carry out this extraction and fractionation in a simple and inexpensive manner which includes only boiling in a suitable solvent to achieve the extraction, followed by cooling to achieve the fractionation.

It is a further object to recover the new products of my invention, natural vitamin B enriched crystalline sugars, or natural vitamin B enriched sugar syrups, as by-products of my new process for the extraction and recovery of vitamin E enriched oil.

It is a still further object to obtain a residual meal, consisting mainly of starch and protein and having high biological value, as a by-product of my new process.

Still further objects of my invention are the recovery of lecithin, sterols, a salad oil, and edible carbohydrates, as by-products of my invention.

With these and other objects in view the process according to the invention generally comprises extracting the wheat germ with a boiling solvent which at boiling temperatures is a solvent for substantially all the oil contained in the wheat germ, but which at a given lower temperature is a solvent for a given fraction of the oil only, cooling the extract to precipitate a given fraction of said oil separating the precipitated oil from the clear solution and recovering and purifying the oil remaining in the solution, the said latter oil containing the major portion of the vitamin E content of the original wheat germ.

It has been found that when wheat germ or the like is extracted with a boiling alcohol-water solvent an oil which consists of a mixture of oils of varying solubility and chemical characteristics is extracted in solution in the solvent. This oil contains substantially all of the vitamin E content of the wheat germ.

It has further been discovered that the vitamin E content of the wheat germ is readily soluble in the oil thus extracted which is soluble at room temperature in the solvent according to the present invention but is only very slightly soluble in the oil insoluble in the said solvent at room temperature, thus by separating the two oils it is possible to obtain a great increase in concentration of vitamin E and obtain a product which may, by simple methods, be further treated to yield an oil which has a concentration of vitamin E suitable for pharmaceutical purposes.

The main advantage of the process according to the present invention is dependent upon the fact that an alcohol-water solution containing 88% to 92% alcohol, and which will be described in greater detail below, will at boiling temperature dissolve and extract from the wheat germ substantially all the oil therein whereas when such solvent, containing the dissolved oil, is cooled to room temperature a major portion of the extracted oil, containing only a very small percentage of the vitamin E content of the wheat germ, is thrown out of solution and may be separated, leaving in solution a minor portion of the extracted oil containing the bulk of the vitamin E content of the wheat germ in a solution which is capable of being concentrated and which may easily be made to undergo further treatment.

Thus, the essential element of the process is the use of a solvent during the extraction which will, at boiling temperatures dissolve out substantially all the oil in the substance being treated, but which will, on cooling, throw out of solution a major portion of the extracted oil, but retain in solution a minor portion of the extracted oil, said minor portion containing the bulk of the vitamin E from the substance treated.

In the preferred solvent according to the invention the solvent comprises 88% to 92% alcohol made up of substantially 85 parts of ethyl alcohol and 15 parts of methyl alcohol, 1% acetic acid (or sufficient hydrochloric acid to give the solvent an acidity of about 0.04 normal), and water to bring the whole up to 100%. I preferably dry the wheat germ before the extraction to avoid the inclusion of an amount of water which might unbalance the proportions of my solvent. The process can, however, be carried out with a solvent made up with alcohol as noted above, but without the acid, and having the percentage of water raised accordingly. However, such a solvent slightly reduces the yield and the vitamin B content of the sugar fraction which is a valuable by-product of the invention and tends to increase the loss of vitamin E during the process, vitamin E being more stable in the presence of acid. Therefore, I preferably use an acidulated alcohol solvent. It is to be understood that wherever an "alcohol-water" solvent is referred to the term "alcohol-water" solvent is intended to include both acidulated and non-acidulated solvents.

The process of my invention will now be described in detail to show the steps for recovering all the products obtainable from wheat germ by means of my process. The process is schematically outlined in the accompanying drawing. It will be realized that many of the steps may be omitted when it is desired to recover a number of products less than the number it is possible to obtain.

A batch of wheat germ is dried to less than 3% moisture and is subjected to a continuous extraction in a boiling acidulated alcoholic solvent of the following precentage composition, Alcohol, 88% to 92%, the alcohol being 15 parts methanol and 85 parts ethanol,
Glacial acetic acid, 1%, or sufficient hydrochloric acid to give the solvent an acidity of about 0.04 normal, and balance water.

The extract is then cooled and the major portion of the extracted oil, which is thrown out of solution, is separated, leaving the clear alcohol solution containing a minor portion of the extracted oil and a major portion of the vitamin E content of the wheat germ. This clear solution is evaporated to eliminate the solvent by distillation under reduced pressure leaving the soluble oil, containing the vitamin E in solution, as a residue. The latter residue is suspended in warm water and the suspension is centrifuged separating the suspension into well defined aqueous and lipoid phases, the latter being in the form of a semi-solid cake on the surface of the aqueous phase. The two phases are separated by decantation and the lipoid phase is pressed substantially to dryness and extracted in dry acetone to dissolve out the sterols and substantially all the vitamin E. The resulting residue is a good grade of lecithin. The acetone extract is concentrated to a small volume and the sterols are crystallized out by letting the extract stand at a temperature of approximately 50° F. The crystallized sterols are filtered off and the filtrate is evaporated to eliminate the acetone, yielding a dark red oil which is rich in vitamin E.

The aqueous phase which was separated from the lipoid fraction by decantation is evaporated to dryness in vacuo, or in an inert atmosphere provided by carbon dioxide or nitrogen, to give a crystalline sugar, pale lemon in color and having a distinctive pleasant sweet flavor.

The insoluble material in the original extract, remaining after the decantation of the cooled clear supernatant alcoholic extract, contains an oil which is separated from the other insoluble materials by decantation. Any residual solvent is removed by heating in vacuo, and a clear oil is obtained which has a bland flavor, contains some 0.15% vitamin E, and might be used as a salad oil. The residual insoluble material resulting from the decantation of the oil is taken up in hot water, and the solution is clarified by adding a small amount of bentonite, heating and filtering. The filtrate is evaporated substantially to dryness in vacuo to give a crystalline sugar product which is about 60% sucrose.

The residual meal from the initial extraction with the boiling alcoholic solvent is dried under conditions permitting recovery of the solvent. It comprises about 60% of the original wheat germ and consists mainly of starch and protein. The protein content is about 40% and is known to have a relatively high biological value. This meal has value as a protein supplement in human foods and in livestock feeds.

A modification of the process according to my invention is the passage of the acetone filtrate through a column of absorbent material such as diatomaceous earth, prior to evaporating to dryness. This gives a colorless oil instead of a dark-red oil. The concentration of vitamin E remains unchanged.

A further modification consists of evaporating the aqueous phase (which was decanted off to separate it from the lipoid fraction), under atmospheric conditions, instead of in vacuo or in an inert atmosphere. This gives a natural vitamin B enriched caramelized syrup with a distinctive odor and flavor reminiscent of the original wheat germ. This distinctive odor and taste may be readily removed if the solution, prior to concentration, is passed through a filter containing a material such as a synthetic ion-exchange resin, in the carbonate form. The caramelized natural vitamin B enriched syrup thus produced has an exceptionally sweet taste, and is of value to the food industry as a basic constituent for soft-drinks and the like.

A further modification in connection with the sugar syrups consists of increasing the acid present in the solvent and correspondingly decreasing the water. This increases the degree of caramelization of the syrups and causes some inversion of the cane sugar to take place, giving the syrup a sweeter taste. For purposes of this modification, the acetic acid may be increased until it amounts to 2.5% of the whole, or if hydrochloric acid is used instead of acetic acid, the amount of hydrochloric acid used may be increased until the acidity of the solvent is about 0.15 normal.

The recovery of the natural vitamin B enriched sugars may be still further modified by combining the two sugar fractions as follows, adding the bentonite-clarified filtrate from the insoluble fraction of the extract, to the residue remaining from the supernatant solution after the recovery of the solvent by distillation. The lipoid fraction is then eliminated as previously described, leaving an aqueous solution which is also treated by any of the methods already disclosed. Through this combination of the two sugar fractions, a substantial economy is achieved since the excess water requiring evaporation is cut substantially in half. However, the crystalline sugars or sugar syrups thus produced are lower in vitamin B than those produced in accordance with the first mentioned steps, since the bentonite-clarified filtrate acts as a diluent for the vitamin B-complex.

An example of a complete process carried out in accordance with my invention will now be given, showing the yields realized of the various products.

Example 200 grams of fresh wheat germ was dried to less than 3% moisture, and placed in an extraction chamber containing a boiling acidulated alcoholic solvent made up as follows, 900 c. c. of an alcohol which is 85% ethyl alcohol and 15% methyl alcohol,
10 c. c. of glacial acetic acid,
90 c. c. of water.

An extraction was carried out for five hours at boiling temperature. The extract was allowed to cool, and was let stand at 50° F. for several hours until the insoluble material had settled, leaving a clear supernatant alcohol solution.

The supernatant alcohol solution was decanted into a distillation flask, and the solvent was recovered by distilling under reduced pressure. The residue was suspended in 200 c. c. of warm water and centrifuged so as to separate into a lipoid phase and an aqueous phase. The aqueous phase was decanted off and evaporated to dryness in vacuo to give a crystalline sugar product with a pale lemon-yellow color and a sweet taste. About 30 grams of this crystalline sugar product were obtained. This product contained vitamin B-complex, and an analysis was made for thiamine and riboflavin. The thiamine content was found to be 56.7 micrograms per gram and the riboflavin content 3.6 micrograms per gram. The lipoid fraction was pressed dry and suspended in 100 c. c. of dry acetone, to give an acetone solution and a residue of lecithin. The lecithin and acetone solution were separated, and lecithin was found to weigh 4 grams. The acetone solution was concentrated to a small volume, and allowed to stand overnight at 50° F. Sterols crystallized out and were filtered off. The sterols were found to weight 0.25 gram. The filtrate was evaporated to dryness, giving 1.8 grams of a dark-red oil containing about 2% of vitamin E.

The insoluble material which settled out upon cooling the extract contained an oil, which was decanted off. The oil was heated in vacuo to remove any residual solvent, and 14 grams of a clear oil remained. This oil had a bland flavor, contained 0.15% vitamin E, and might be usable as a salad oil without further treatment. The insoluble material remaining after the decantation of the oil was taken up in 200 c. c. of hot water, 2 grams of bentonite were added, and the whole was heated to boiling, and subjected to a filtering process. The material held by the filter was discarded, and the filtrate was evaporated to dryness in vacuo, yielding 9.6 grams of edible carbohydrate, which was about 60% sucrose.

The residual meal from the first mentioned extraction with acidulated alcohol, was dried under conditions which permitted recovery of the solvent. The meal weighed 118 grams and contained 40% protein.

It will be apparent from the above disclosure that a process for obtaining vitamin E enriched oil has been provided which eliminates the expensive and time consuming procedure of solvent fractionation of the extracted oil required by prior process. It will be apparent, however, that the process provided is simple to carry out and requires no specialized apparatus. Moreover, the variety of by-products produced during the various stages of the process is of considerable economic benefit and has the overall effect of lending considerable economic advantages to the process of the invention.

What I claim as my invention is:

1. The process for preparing a vitamin E enriched oil from wheat germ, comprising extracting the wheat germ with a boiling alcohol-water solvent containing 88-92% alcohol; cooling the extract to a lower temperature at which a major portion of the oils extracted from the wheat germ are thrown out of solution, said major portion being of such a nature that vitamin E is substantially insoluble therein; separating the said major portion from the cooled extract; removing the solvent from the cooled extract by evaporation, taking up the resulting residue in hot water and centrifuging to produce a lipoid phase and an aqueous phase, separating and drying the lipoid phase and extracting the same with acetone, separating the extract, concentrating the latter and crystallizing out sterols contained therein, separating the sterols, and evaporating the remaining acetone from the solution to produce a vitamin E enriched oil containing the bulk of the vitamin E content of the original wheat germ.

2. The process for preparing a vitamin E enriched oil from wheat germ comprising, extracting the wheat germ with a boiling alcohol-water solvent containing 88-92 per cent alcohol; cooling the extract to a lower temperature at which a major portion of the oils extracted from the wheat germ are thrown out of solution, said major portion being of such a nature that vitamin E is substantially insoluble therein; separating the said major portion from the cooled extract; removing the solvent from the cooled extract by evaporation; taking up the resulting residue in hot water and centrifuging to produce a lipoid phase and an aqueous phase, separating and drying the lipoid phase and extracting the same with acetone, separating the extract, and evaporating the remaining acetone from the solution to produce a vitamin E enriched oil containing the bulk of the vitamin E content of the original wheat germ.

WILLIAM DOUGLAS McFARLANE.

REFERENCES CITED

The following references are of record in the file of this patent:

UNITED STATES PATENTS

| Number | Name | Date |
|---|---|---|
| 845,616 | Chute | Feb. 26, 1907 |
| 1,869,721 | Sure | Aug. 2, 1932 |
| 2,136,453 | Merker | Nov. 15, 1938 |
| 2,251,234 | Swain | July 29, 1941 |
| 2,345,578 | Buxton | Apr. 4, 1944 |
| 2,360,775 | Colman | Feb. 20, 1945 |

FOREIGN PATENTS

| Number | Country | Date |
|---|---|---|
| 477,528 | Great Britain | Dec. 30, 1937 |

OTHER REFERENCES

Rosenberg: Chemistry and Physiology of Vitamins (1942), page 438.

Sherman: The Vitamins, 2nd ed. (1931), page 62.